United States Patent
Carroll

(10) Patent No.: US 10,253,796 B2
(45) Date of Patent: Apr. 9, 2019

(54) APPARATUSES FOR MOUNTING FIXTURES TO A SUBSTRATE, AND RELATED METHODS

(71) Applicant: Pera Moulding & Design Inc., Lloydminster (CA)

(72) Inventor: Michael Carroll, Lloydminster (CA)

(73) Assignee: Pera Moulding & Design Inc., Lloydminster (CA)

( * ) Notice: Subject to any disclaimer, the term of this patent is extended or adjusted under 35 U.S.C. 154(b) by 0 days.

(21) Appl. No.: 15/191,187

(22) Filed: Jun. 23, 2016

(65) Prior Publication Data
US 2017/0370388 A1    Dec. 28, 2017

(51) Int. Cl.
| F16B 5/12 | (2006.01) |
| E04F 13/08 | (2006.01) |
| F16B 5/06 | (2006.01) |

(52) U.S. Cl.
CPC ............ *F16B 5/128* (2013.01); *E04F 13/086* (2013.01); *E04F 13/0841* (2013.01); *F16B 5/0642* (2013.01); *F16B 5/126* (2013.01)

(58) Field of Classification Search
CPC ......... F16B 5/128; F16B 5/126; F16M 13/02; E04F 13/0841; E04F 13/086
USPC .................. 40/732, 743, 781, 772, 757, 700
See application file for complete search history.

(56) References Cited

U.S. PATENT DOCUMENTS

| 2,006,962 | A | * | 7/1935 | Ostrander | ............ | A47G 1/1606 |
| | | | | | | 248/224.51 |
| 3,058,518 | A | * | 10/1962 | Housman | ................ | E06B 3/285 |
| | | | | | | 160/380 |
| 4,165,852 | A | | 8/1979 | Chervenak | | |
| 4,399,640 | A | * | 8/1983 | Porter | ........................ | E06B 3/28 |
| | | | | | | 160/368.1 |
| 4,457,436 | A | | 7/1984 | Kelley | | |
| 4,513,941 | A | * | 4/1985 | Yamaguchi | ......... | E04F 13/0862 |
| | | | | | | 249/91 |
| 4,794,714 | A | * | 1/1989 | Weisgerber | ............ | A47G 1/065 |
| | | | | | | 40/735 |
| 6,684,545 | B2 | * | 2/2004 | Wohlleb | .................... | A47G 1/06 |
| | | | | | | 40/729 |

(Continued)

OTHER PUBLICATIONS

Bunnings Warehouse, Naleon Signature Stainless Steel Acrylic Suction Bathroom Shelf, URL=https://www.bunnings.com.au/naleon-signature-stainless-steel-acrylic-suction-bathroom-shelf_p4821032, accessed on Mar. 2, 2015, 3 pages.

*Primary Examiner* — Joshua K Ihezie
(74) *Attorney, Agent, or Firm* — Robert A. Nissen

(57) ABSTRACT

A method includes: mounting a rail on a wall; mounting a fixture on the rail by interlocking a channel of the fixture to the rail; removing the fixture from the rail; and mounting a replacement fixture on the rail by interlocking a channel of the replacement fixture to the rail. An apparatus has: a rail with a wall contacting base side, an exterior side, and a beam formed on the exterior side; a fixture with a base side, an exterior side, and a channel formed on the base side; and in which the channel forms a female profile that reversibly interlocks via a snap fit to a male profile formed by the beam to reversibly mount the fixture on the rail, with respective longitudinal axes of the beam and the channel extending in respective axial directions along the rail. The fixture and rail may retain a panel over the substrate.

19 Claims, 7 Drawing Sheets

(56) References Cited

U.S. PATENT DOCUMENTS

| | | | | |
|---|---|---|---|---|
| 6,820,360 B2* | 11/2004 | Glazer | ................. | A47G 1/0627 |
| | | | | 40/700 |
| 6,962,016 B1* | 11/2005 | Meyer | ................. | A47G 1/0605 |
| | | | | 40/700 |
| 7,147,196 B2* | 12/2006 | Knight | ..................... | G09F 7/18 |
| | | | | 248/476 |
| 7,708,252 B2 | 5/2010 | Vander Berg et al. | | |
| 8,366,067 B2* | 2/2013 | Felton | ................. | A47B 96/067 |
| | | | | 248/223.41 |
| 8,595,968 B2* | 12/2013 | Byfield | ................ | A47G 1/0616 |
| | | | | 40/732 |
| 2008/0092480 A1* | 4/2008 | Stanley | .................. | E04F 19/02 |
| | | | | 52/716.8 |
| 2011/0219706 A1* | 9/2011 | Bates | ................. | A47B 95/008 |
| | | | | 52/36.1 |
| 2011/0302865 A1* | 12/2011 | Kliegle | ............... | E04F 13/0835 |
| | | | | 52/483.1 |

* cited by examiner

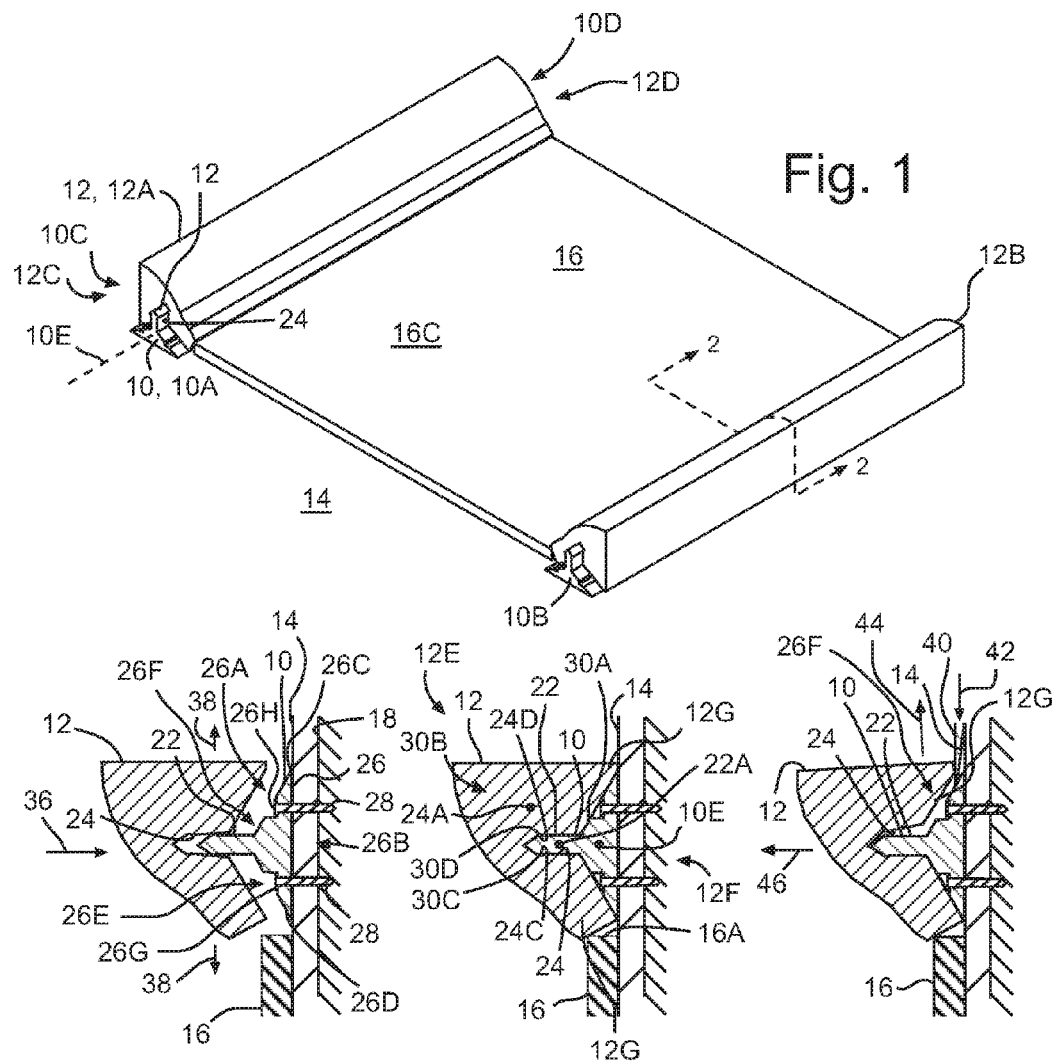
Fig. 1
Fig. 2A    Fig. 2B    Fig. 2C
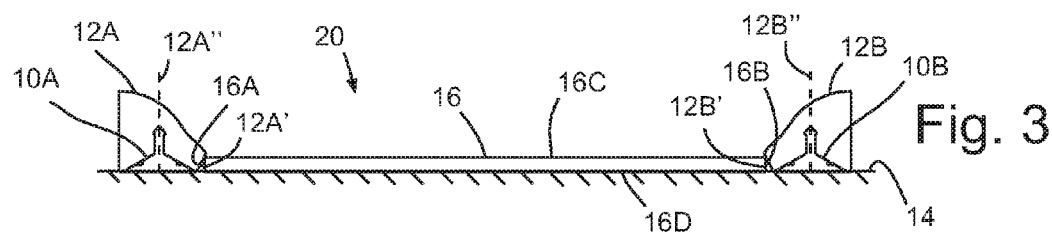
Fig. 3

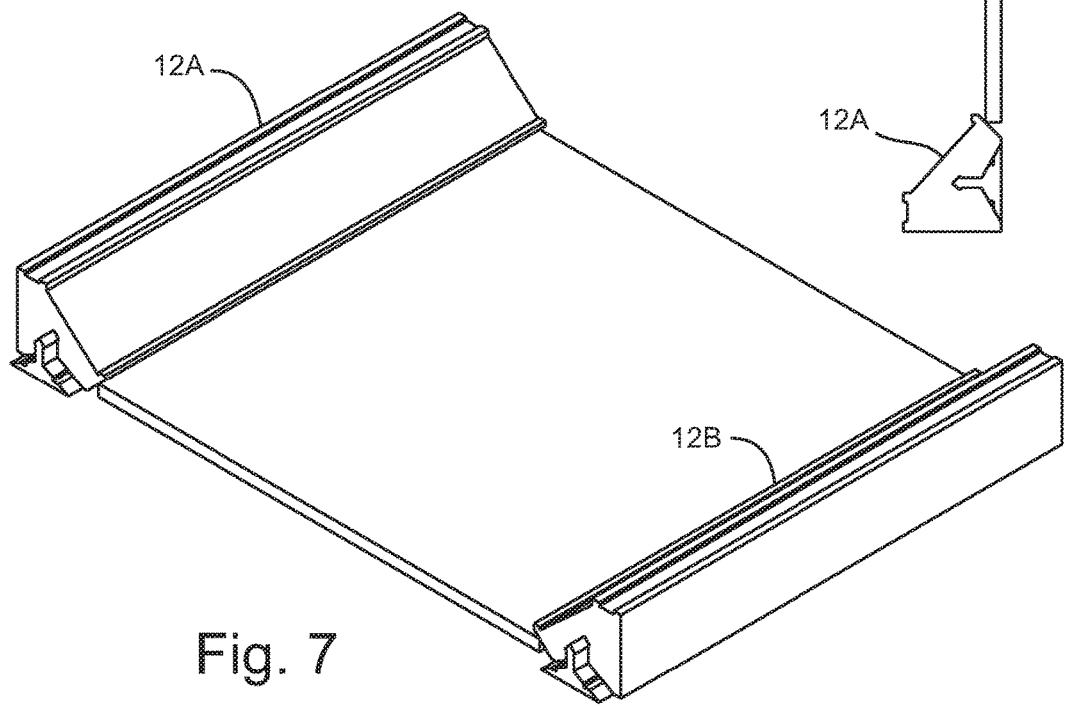

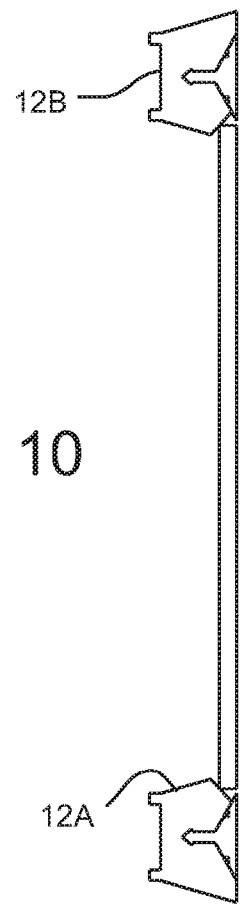
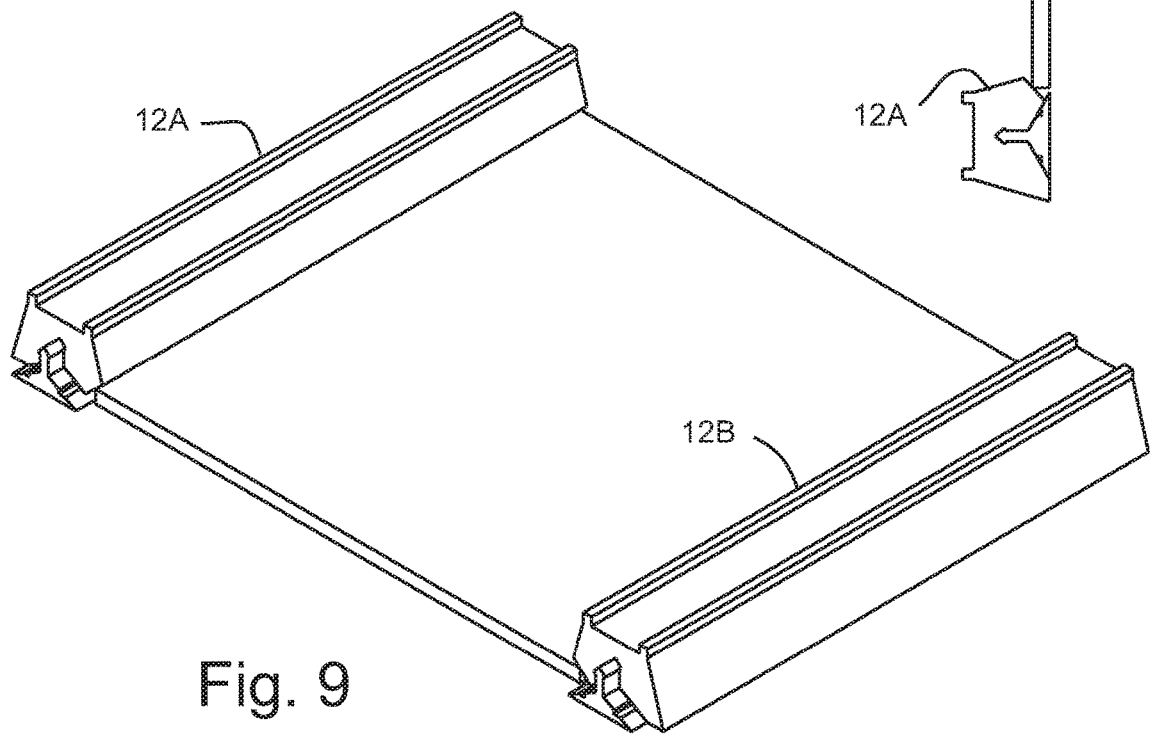

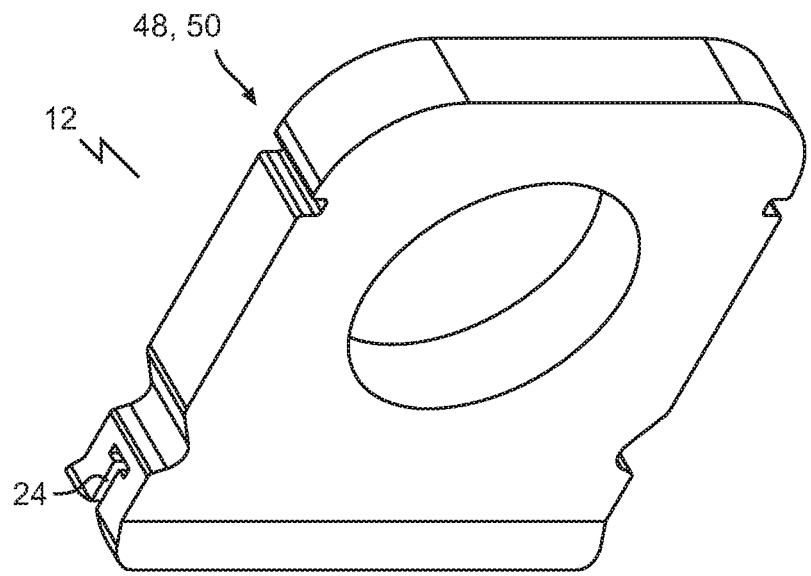
Fig. 11
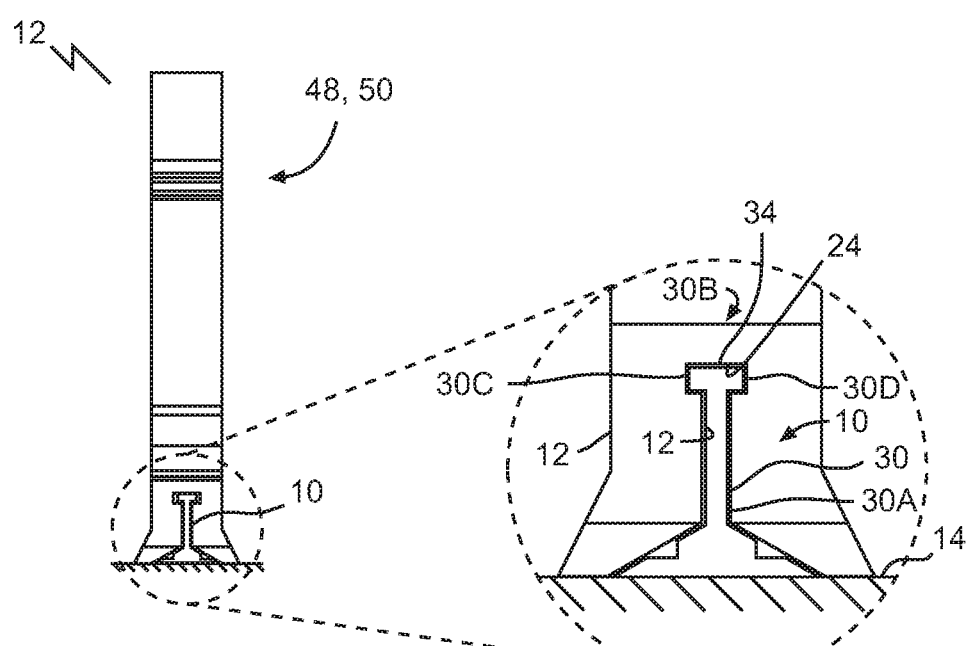
Fig. 12
Fig. 12A

APPARATUSES FOR MOUNTING FIXTURES TO A SUBSTRATE, AND RELATED METHODS

TECHNICAL FIELD

This document relates to apparatuses for mounting fixtures to a substrate, and related methods.

BACKGROUND

Mechanisms used to mount fixtures on a substrate include fasteners, brackets, and adhesives.

SUMMARY

An apparatus is disclosed comprising: a substrate; a rail mounted to the substrate; a first bracket mounted to the rail; a second bracket mounted to the substrate and spaced to define a gap between the first bracket and the second bracket; and a panel retained by the first bracket and the second bracket in a position within the gap and over the substrate.

A method comprising: mounting a rail on a wall; mounting a fixture on the rail by interlocking a channel of the fixture to the rail; removing the fixture from the rail; and mounting a replacement fixture on the rail by interlocking a channel of the replacement fixture to the rail.

An apparatus comprising: a rail with a wall contacting base side, an exterior side, and a beam formed on the exterior side; a fixture with a base side, an exterior side, and a channel formed on the base side; and in which the channel forms a female profile that reversibly interlocks via a snap fit to a male profile formed by the beam to reversibly mount the fixture on the rail, with respective longitudinal axes of the beam and the channel extending in respective axial directions along the rail.

In various embodiments, there may be included any one or more of the following features: The first bracket is mounted to the rail via interlocking mating parts on the first bracket and the rail. The interlocking mating parts comprise a beam and a channel forming a male profile and a female profile, respectively. Respective longitudinal axes of the beam and the channel extend in respective axial directions along the rail, with the male profile and the female profile being defined in cross-section perpendicular to the respective longitudinal axes. The respective longitudinal axes extend parallel to a longitudinal rail axis. Each of the male profile and the female profile extends with uniform shape at least part way along the respective longitudinal axes. The beam forms an extrusion. The beam is formed on the rail. The beam extends from axial end to axial end of the rail. The channel is open-ended and extends from axial end to axial end of the first bracket. The rail forms a base plate that has a substrate contacting side and an exterior side, which mounts the beam. The beam is mounted to the exterior side between opposed lateral edges of the base plate, with a pair of shoulders, of the exterior side, located on either lateral side of the beam. The pair of shoulders are each tapered with increasing distance from the substrate in a direction from an adjacent respective outside lateral edge of the base plate to the beam. The pair of shoulders each comprise a fastener positioning guide. Each fastener positioning guide forms a channel or shelf whose longitudinal axis runs parallel to a longitudinal rail axis. The male profile of the beam is formed by a stem with a lateral projection, with the female profile having a lateral slot shaped to receive the lateral projection. The male profile has a pair of opposed lateral projections on either side of the stem. The stem forms a base and a tip, with the tip and pair of opposed lateral projections being formed by respective apexes of a rhombus defined in cross section perpendicular to a longitudinal rail axis. The stem forms a base and a tip, with the tip and lateral projection being formed with the shape of a rectangle defined in cross section perpendicular to a longitudinal rail axis. The interlocking mating parts form a snap fit. A second rail is mounted to the substrate, in which the second bracket is mounted to the second rail via second interlocking mating parts on the second bracket and the second rail. The second interlocking mating parts comprise a second beam and a second channel forming a second male profile and a second female profile, respectively, in which respective longitudinal axes of the second beam and the second channel extend in respective axial directions along the second rail, with the second male profile and the second female profile being defined in cross-section perpendicular to the respective longitudinal axes. Respective lateral shoulders of the first bracket and the second bracket engage opposed sides of a peripheral edge of the panel. Each respective lateral shoulder is tapered with increasing distance from a plane, defined perpendicular to the substrate along a respective longitudinal axis of the respective first bracket or second bracket, when moving away from the substrate. The panel is a decorative tile. The first bracket forms a decorative moulding that covers and hides the rail from view. The substrate is a wall. The panel forms part of a kitchen backsplash. The panel forms part of a bathroom backsplash. The fixture and the replacement fixture mount by pushing the respective fixture and the replacement fixture against the rail in a direction perpendicular to the wall. The fixture is removed from the rail by pulling or pushing the fixture away from the rail in a direction perpendicular to the wall. The fixture and the replacement fixture form distinct respective decorative mouldings. The fixture and replacement fixture form a first bracket. Mounting the fixture on the rail comprises positioning a panel over the wall and mounting a second bracket on the wall to retain the panel between the first bracket and the second bracket. Removing the fixture from the rail comprises removing the panel. Mounting the replacement fixture comprises positioning a replacement panel over the wall to retain the replacement panel between the first bracket and the second bracket. Mounting the rail on the wall comprises mounting a first rail and a second rail spaced from one another on the wall. Mounting the fixture on the rail comprises mounting a first fixture and a second fixture on the first rail and the second rail, respectively, the first fixture forming the first bracket and the second fixture forming the second bracket. Removing the fixture from the rail comprises removing the first fixture and the second fixture from the first rail and the second rail, respectively. Mounting the replacement fixture comprises mounting a replacement first fixture and a replacement second fixture on the first rail and the second rail, respectively, the replacement first fixture forming the first bracket and the replacement second fixture forming the second bracket. The fixture comprises a shelf. Each of the male profile and the female profile extends with uniform cross-sectional shape along the respective longitudinal axes. The male profile of the beam is formed by a stem with a lateral projection, with the female profile having a lateral slot shaped to receive the lateral projection. The male profile has a pair of opposed lateral projections on either side of the stem. The stem forms a base and a tip, with the tip and pair of opposed lateral projections being formed by respective apexes of a rhombus defined in cross section perpendicular to a longitudinal rail axis. The stem forms a base and a tip, with the tip and lateral projection being formed with the shape of a rectangle defined in cross section perpendicular to a longitudinal rail axis. The rail forms a base plate that forms the wall contacting side, the beam is mounted to the exterior side between opposed lateral edges of the base plate, with a pair of shoulders, of the exterior side, located on either lateral side of the beam. The pair of shoulders are each tapered with increasing distance from the wall contacting side in a direction from an adjacent respective outside lateral edge of the base plate to the beam. The pair of shoulders each comprise a fastener positioning guide. The fixture comprises a shelf. The fixture comprises a tooth brush holder. The bracket forms a decorative moulding that covers and hides the rail from view when the apparatus is mounted to a wall.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which:

FIG. 1 is a perspective view of an apparatus for mounting a panel to a substrate, the apparatus having a pair of rails and respective brackets.

FIGS. 2A-C are a sequence of section views depicting a process for installing and removing one of the brackets to and from a respective rail from the apparatus of FIG. 1. FIG. 2B is a view taken along the 2-2 section lines from FIG. 1, and FIGS. 2A and 2C are all taken from the same relative position as FIG. 2B.

FIG. 3 is an end view of the apparatus shown in FIG. 1.

FIG. 7 is a perspective view of an apparatus having a pair of brackets with a different external appearance than the brackets shown in FIG. 1.

FIG. 8 is an end view of the apparatus shown in FIG. 7.

FIG. 9 is a perspective view of an apparatus having a pair of brackets with a different external appearance than the brackets shown in FIGS. 1 and 7.

FIG. 10 is an end view end of the apparatus shown in FIG. 9.

FIG. 11 is a perspective view of a cup or toothbrush holding fixture for mounting on the rail shown in FIG. 12.

FIG. 12 is an end view of the apparatus shown in FIG. 11.

FIG. 12A is an exploded view of the area delineated by dashed lines in FIG. 11.

DETAILED DESCRIPTION

Figure 4:
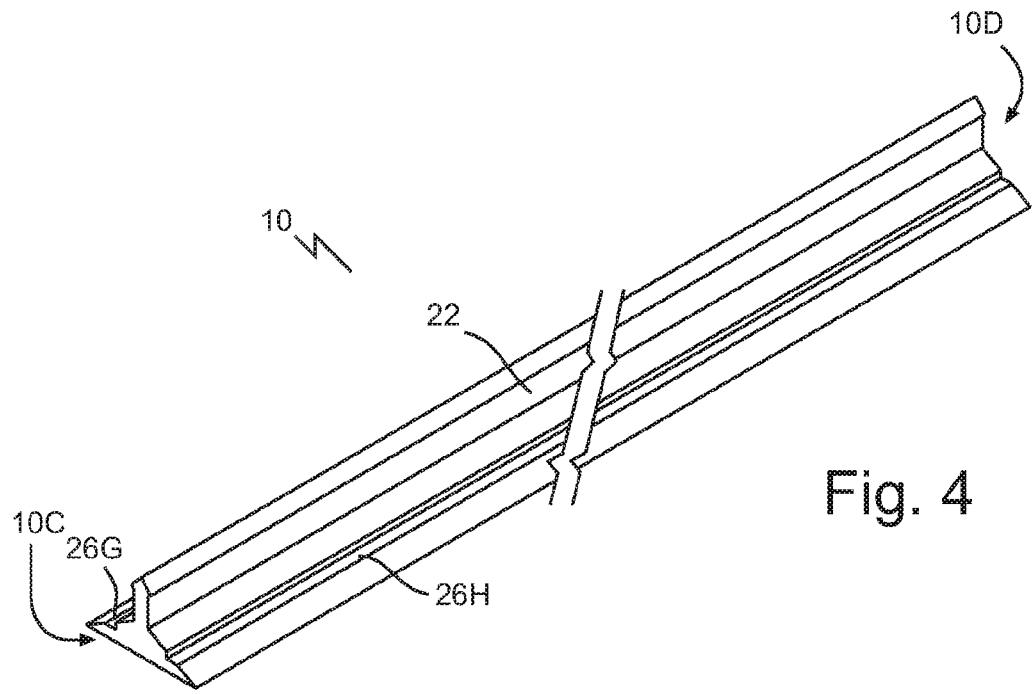
FIG. 4 is a perspective view of a rail used in the apparatus of FIG. 1 and having indeterminate length.

Immaterial modifications may be made to the embodiments described here without departing from what is covered by the claims.

Fixtures, for example lights, panels, tiling, pictures, cabinets, or shelves, may be mounted to a substrate, such as a wall, via a variety of mounting systems. Such mounting systems may use fasteners, for example nails, screws or anchors, adhesives, for example contact cement, epoxy or double-sided tape, or wall plugs. Multiple pieces of equipment may be needed to install such mounting systems, for example hammers, levels, and drills to ensure that fixtures are properly leveled, spaced and secured. Replacement of mounted fixtures may require removing the fixture and mounting system, and fixing damage done to the substrate by the mounting system, followed by installation of a further mounting system. In the case of drywall it is common for such mounting systems to cause damage in the form of holes and perforations, which may require mudding, taping, and painting to repair.

Referring to FIG. 1, an apparatus is illustrated comprising a fixture 12 and a rail 10. In use the rail 10 mounts the fixture 12 to a substrate 14, such as a wall. The rail 10 may provide a universal mounting system that permits various fixtures to be added, replaced, or removed, with relative ease using the same underlying rail, for example to update the look, feel, and function of the fixture and hence the look, feel, and function of the room or area in which the fixture is located. In some cases the rail 10 and the fixture 12 may cooperate to form a mechanism for mounting panels, such as tiling used in a backsplash, in a way that permits the panels to be added, removed, or replaced with relative ease.

Referring to FIG. 2B, fixture 12 and rail 10 may be structured to mate with one another via a suitable mechanism, for example interlocking mating parts on rail 10 and fixture 12. Interlocking mating parts may engage one another in a suitable fashion such as by overlapping or fitting together corresponding projections and recesses or slots. In some cases the interlocking mating parts fit together or form a snap fit. A snap fit is an assembly method used to attach flexible or resilient parts to engage one another by pushing or pulling the parts' interlocking components together. In some cases only one of the parts has a flexible or resilient character.

A suitable snap fit includes a cantilever, torsional or annular mechanism. In the example shown the fixture 12 has a pair of resilient legs 12G that define a channel 24 to fit a beam 22 of rail 10, with the fixture 12 and rail 10 forming a form of a torsional snap fit. In a torsional snap fit, the user must deflect, or force the protruding edge or edges of one piece away from the insertion area. Referring to FIGS. 2A-B, in the example shown, when the fixture 12 is pushed or pulled against rail 10 in a direction 36 perpendicular to substrate 14, the legs 12G contact the beam 22 and are deflected, for example in lateral directions 38, as discussed further below. Upon deflection, the other piece may slide in between the protruding edge until the desired distance is reached. Once interlocking has been achieved (FIG. 2B), each leg 12G may return to a neutral respective configuration such that fixture 12 is secured in the interlocked position, relative to rail 10, with the legs 12G under no lateral tension or under a nonzero lateral tension in the case of an interference fit with the stem. A suitable snap fit may incorporate a spring or other mechanism. The snap-fit may be configured for multiple use, and may have a lever or pin to be pushed, in order to undo the snap-fit.

In some cases the interlocking mating parts may form an interference fit, which is a fit in which the external dimension of one part slightly exceeds the internal dimension of the part into which it is adapted to fit. An example of an interference fit is a press fit, in which one mating part is installed by being forced under pressure into a slightly smaller hole or recess in the other mating part.

Referring to FIG. 2B, fixture 12 may take any of a variety of forms to fulfill a variety of decorative purposes. For example, fixture 12 may form a decorative moulding, crown moulding, decorative bar or decorative cap that covers and hides rail 10 from view. The decorative cap may cover an axial portion of rail 10 or completely cover rail 10.

Referring to FIG. 2A, the interlocking mating parts may comprise beam 22 and channel 24 forming a male profile and a female profile, respectively. Rail 10 may form a base, such as base plate 26, with a substrate contacting side 26A, an exterior side 26B, and in some cases walls (not shown) separating the two sides 26A and 26B. When base plate 26 is mounted to substrate 14, substrate contacting side 26A of base plate 26 faces substrate 14. Beam 22 may be formed on exterior side 26B of base plate 26.

Figure 5:
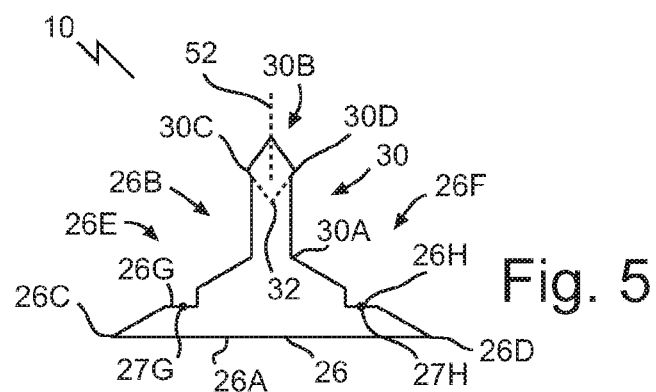
FIG. 5 is an end view of the rail shown in FIG. 4.
Figure 6:
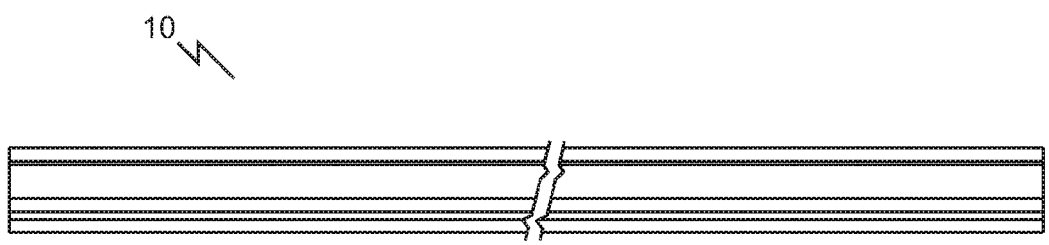
FIG. 6 is a side view of the rail shown in FIG. 4.

Referring to FIG. 2B, the male profile of beam 22 may be formed by a stem 30 with a lateral protrusion or projection 30C and the female profile of channel 24 may have a lateral slot 24C shaped to receive the lateral projection or protrusion. Referring to FIG. 5, stem 30 may comprise a stem base 30A and a stem tip 30B. The male profile of beam 22 may have a pair of opposed lateral projections 30C and 30D on either side of stem 30. Referring to FIG. 2B, the female profile of channel 24 may have a pair of opposed lateral slots 24C and 24D shaped to receive opposed lateral projections 30C and 30D. Fixture 12 may comprise an exterior side 12E and a base side 12F. Base side 12F of fixture 12 may form the pair of legs 12G that define channel 24.

Beam 22 and channel 24 may have dimensions suitable for mating with one another. Referring to FIG. 1, beam 22 may extend from one axial end 10C to an opposed axial end 10D of the rail 10. Channel 24 may extend from one axial end 12C to an opposed axial end 12D of the fixture 12 and may be open-ended. Beam 22 may have an axial length that is equal to or shorter than an axial length of rail 10. Beam 22 may have an axial length that is equal to, shorter than, or longer than the axial length of channel 24. Channel 24 may have an axial length that is equal to or shorter than an axial length of fixture 12.

Referring to FIG. 2B, the male profile of beam 22 and the female profile of channel 24 may be aligned to cooperate together in a suitable fashion when mated. The male profile of beam 22 and the female profile of channel 24 may be defined in cross section perpendicular to respective longitudinal axes 22A and 24A. The longitudinal axes 22A and 24A may extend in respective axial directions along rail 10, for example parallel to a longitudinal rail axis 10E. Each of the male profile of beam 22 and the female profile of channel 24 may have respective uniform shapes suitable for mating with one another. Referring to FIG. 1, each of the male profile of beam 22 and the female profile of channel 24 may extend with uniform shape at least part way, along respective longitudinal axes 22A and 24A. In some cases, each of the male profile of beam 22 and the female profile of channel 24 extend with uniform shape along full axial lengths of beam 22 and channel 24, respectively. A beam and channel of continuous shape along the axial length may permit the length of the rail and fixture to be tailored to any suitable length for a suitable application. A continuous shape may permit the rail 10 to be gripped at any of an infinite number of positions along the fixture 12, and vice versa, for flexibility of use. Plural fixtures may be mounted on a single rail, or a single fixture may be mounted on plural rails.

Referring to FIG. 2B, the mating profiles of beam 22 and channel 24 may have shapes suitable for mating with one another. Referring to FIG. 5, stem tip 30B and the pair of opposed lateral projections 30C and 30D may be formed at respective apexes of a rhombus 32 defined in cross section perpendicular to longitudinal rail axis 10E. Referring to FIG. 12A, in some cases, stem tip 30B and the pair of opposed lateral projections 30C and 30D form the shape of a rectangle 34 defined in cross section perpendicular to longitudinal rail axis 10E and adapted for relatively increased weight-bearing capacity such as when the fixture is used as a shelf. In some cases, the pair of opposed lateral projections 30C and 30D, with or without the stem tip 30B, form part of the shape of a square, diamond, ball, bulb or arrowhead or otherwise define a flared end (not shown) in cross section perpendicular to longitudinal rail axis 10E. Referring to FIG. 5, stem tip 30B may be positioned on a central axis 52 of the stem and that may be perpendicular to substrate 14. The opposed lateral projections 30C and 30D may extend in opposed directions between the stem base 30A and the tip 30B. Referring to FIG. 2B, the female profile of the channel 24 may have a shape that matches, for example, is the inverse of, the shape of the male profile, or may have a different shape so long as the two profiles correspond to lock the parts together. In some cases the channel 24 may have one or more lateral protrusion, into which one or more lateral slots or recesses in the stem may fit.

Referring to FIG. 2B, one or both beam 22 of rail 10 and channel 24 of fixture 12 may be formed by extrusion. An extrusion may be formed by pushing a material through a die having the desired cross section. The resulting object has a fixed cross-sectional profile, for example a male profile or a female profile. The material used to form the extrusion may be metal. In some cases, beam 22 may form an extrusion on rail 10, for example a metal extrusion such as an aluminum extrusion.

Referring to FIG. 2A, fixture 12 may be reversibly mounted to rail 10 to allow for the re-use of the rail 10 with the same or a different fixture or fixtures. Reversibility refers to the fact that the fixture 12 may be removed from the rail 10 in a way that permits the rail 10 to be re-used, for example if the fixture 12 can be removed without damaging the rail 10 or without requiring that the rail 10 be removed from the wall. In some cases reversibility may also refer to the fact that the fixture 12 may be removed in a way that permits the fixture 12 to be removed, for example if the original configuration of fixture 12 is preserved following a mounting operation and a subsequent removal operation such that fixture 12 may be re-mounted via a similar mounting operation.

Referring to FIGS. 2A and 5, beam 22 may be mounted to exterior side 26B of base plate 26, for example between opposed lateral edges 26C and 26D of base plate 26. A pair of shoulders 26E and 26F of exterior side 26B may be located on either lateral side of beam 22. Each shoulder of the pair of shoulders 26E and 26F may be tapered with increasing distance from substrate 14 (or a substrate contacting plane defined by the base if the base is not secured to the substrate) in a direction from respective adjacent outside lateral edge 26C or 26D of base plate 26 to beam 22, for example to form respective ramps. In some cases only one such ramp is defined, for example if only one such shoulder 26E or 26F is defined.

Referring to FIG. 2C the shoulder or shoulders 26E and F may permit the beam part or fixture 12 to be removed without damage to rail 10 and substrate 14. A suitable tool, such as a wedge or a pry bar 40, may be inserted between fixture 12 and rail 10, for example in a direction 42, to begin the removal of fixture 12. Each tapered shoulder 26E and 26F may form an angle, relative to substrate 14, suitable for lifting fixture 12 from rail 10, for example an angle of forty five degrees or less, such as an angle of ten degrees or less. Referring to FIG. 2C, as pry bar 40 is inserted between fixture 12 and rail 10, pry bar 40 traverses tapered shoulder 26F (FIG. 2A), contacting a respective leg 12G to impart upon leg 12G a force in a lateral direction 44 to permit the legs 12G to open such that the fixture 12 may be removed from the rail 10 via a force in a direction 46 from the rail 10. Once fixture 12 has been removed, a replacement fixture may be mounted to rail 10 by interlocking a channel of the replacement fixture with rail 10, for example using the method shown in FIGS. 2A-B. When fixture 12 is removed and replaced in a fashion disclosed in this document, damage to rail 10 and substrate 14 may be minimized or avoided, relative to a removal and replacement operation involving the application of adhesives or fasteners to fixture 12.

Referring to FIGS. 2A, 4 and 5, the rail 10 may incorporate one or more fastener guides. For example, each shoulder of the pair of shoulders 26E and 26F (FIGS. 2A and 5) is illustrated with a respective fastener positioning guides 26G and 26H. Fastener positioning guides 26G and 26H may each form a channel, shelf, groove, ridge or other shape. Referring to FIG. 5, longitudinal axes 27G and 27H of respective fastener positioning guides 26G and 26H may each run parallel to longitudinal rail axis 10E (FIG. 2B). Fasteners such as nails, screws or anchors may be applied along fastener positioning guides 26G and 26H to mount rail 10 to substrate 14 (FIG. 3). Referring to FIG. 2A, fastener positioning guides 26G and 26H may assist the user to position fasteners to secure the rail 10. In some cases the guides 26G and H are positioned with external surfaces parallel to the substrate 14, or with other suitable features to permit the user to install fasteners in a direction perpendicular to substrate 14 for maximum penetration through the substrate 14, for example into a stud 18 (FIG. 2A). In some cases one or more guides are present. In some cases fastener positioning guides 26G and 26H may have discrete slots, for example spaced along respective axial lengths of fastener positioning guides 26G and 26H, for application of fasteners. However, a guide that runs continuously in an axial direction as shown will permit an infinite number of positions for fasteners, providing relatively greater flexibility to insert fasteners at locations overlying studs 18 than is possible with discrete slots. Other fastener position markers may be used.

Referring to FIGS. 1, 3 and 7-10, fixture 12 may mount to rail 10 and be adapted to operate as a first bracket 12A that supports a panel 16, for example a decorative tile forming a backsplash in a kitchen or a bathroom, between the first bracket 12A and a second bracket 12B. Panel 16 may take any of a variety of forms to fulfill a variety of purposes. In some cases, panel 16 is a tile or plurality of tiles that form part of a kitchen backsplash or bathroom backsplash adapted to minimize splash damage to walls adjacent to water sources such as kitchen sinks or bathroom sinks. Referring to FIG. 3, second bracket 12B may be mounted to substrate 14 and spaced, relative to first bracket 12A, to define a gap 20 between first bracket 12A and second bracket 12B. Panel 16 may be retained by first bracket 12A and second bracket 12B in a position within gap 20 and over substrate 14. Panel 16 may have opposed faces, such as an external display face 16C and a base face 16D. When retained, panel 16 may be held in place and base face 16D hidden from view. Display face 16C of panel 16 may be directed outward and away from substrate 14.

Figure 15:
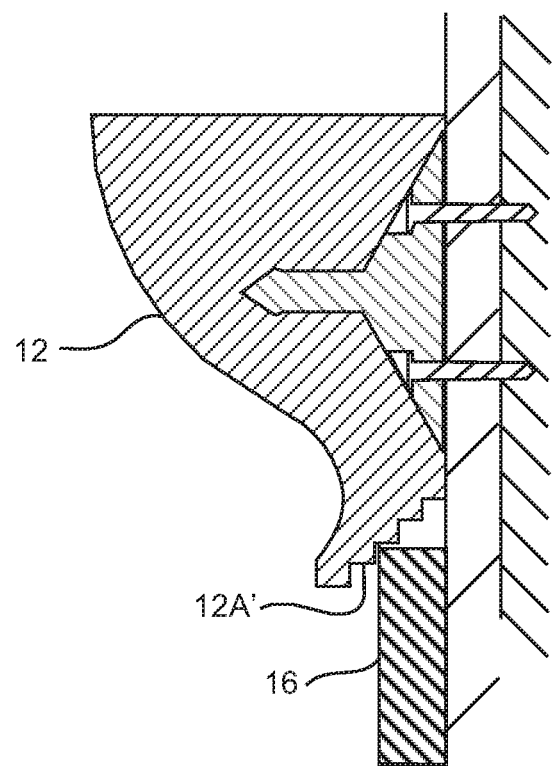
FIG. 15 is a section view of a notched or stepped lateral shoulder of a fixture for a rail.

First bracket 12A and second bracket 12B may be structured to retain panel 16 via a suitable mechanism. Referring to FIG. 3, a lateral shoulder 12A' of first bracket 12A and a lateral shoulder 12B' of second bracket 12B may engage a peripheral edge of panel 16, for example by gripping opposed respective edges 16A and 16B of panel 16. Lateral shoulders 12A' and 12B' may be tapered with increasing distance from respective planes 12A" and 12B" when moving away from substrate 14. Planes 12A" and 12B" may be defined perpendicular to substrate 14 along longitudinal axes of respective brackets 12A and 12B. The orientation of such shoulders 12A' and 12B' forms respective overhangs that grip an exterior display edge of the panel 16 to push the panel 16 against the substrate 14. Together, the tapered configurations of lateral shoulders 12A' and 12B' may facilitate retention of panel 16 via the application of force towards panel 16 and towards substrate 14. Notches, shoulders, or grooves may be formed in lateral shoulders 12A', 12B' to retain panel 16, for example a groove that runs the full axial length of the lateral shoulder and forms a ninety degree angle in cross-section to engage the peripheral edge and display face of the panel. Referring to FIG. 15 an example is shown where the lateral shoulder 12A' has a stepped cross-sectional shape to engage a variety of panels of different thicknesses. In some cases (not shown), panel 16 may be retained by a bracket or brackets on adjacent edges of the peripheral edge. Referring to FIG. 3, lateral shoulders 12A' and 12B' of respective brackets 12A and 12B may form a compression fit with panel 16 in which lateral shoulders 12A' and 12B' grip or squeeze panel 16 in place. Referring to FIG. 3, panel 16 may rest over substrate 14. In some cases, panel 16 and substrate 14 are spaced such that panel 16 and substrate 14 do not make direct contract. In some cases the panel 16 may comprise a plate, such as a backing ceramelite plate, that supports a plurality of tiles, which may be secured to the plate for example by cement, for example to mount a tiling pattern upon the substrate 14.

In some cases, the use of a pair of brackets 12A and 12B permit the panel 16 to be reversibly mounted against the substrate 14 without direct application of adhesives, fasteners or other substrate damaging systems between the panel 16 and the substrate 14. By contrast, a traditional method of installing a backsplash involves placing a bed of contact cement or other adhesive over the wall, upon which the tile backsplash is laid and secured. The subsequent removal of the tiles and the set cement layer may cause damage to the substrate 14. A damaged substrate may need to be mudded, taped, and painted prior to application of further updated tiling.

Referring to FIG. 1, to remove the panel 16 a suitable procedure may be followed. In some cases one or both first bracket 12A or second bracket 12B may be removed to permit the panel 16 to be accessed and removed. Once bracket 12A (or 12B) has been removed, panel 16 is no longer retained and can be removed as well. A replacement panel (not shown) and one or more replacement brackets 12A and 12B may be positioned and secured together in a fashion similar or identical to that used to secure the initial brackets 12A, 12B, and initial panel 16. The removal of each bracket 12A/12B may be done without removing the underlying rail 10A or 10B.

Referring to FIGS. 1 and 3, second bracket 12B may take a suitable form. For example, second bracket 12B is illustrate as being mounted to substrate 14 via a second rail 10B, with second bracket 12B and rail 10B taking on one, some, or all of the features described elsewhere in this document for rail 10 and fixture 12. Referring to FIG. 3, in the example shown, the rails 10A and 10B and the brackets 12A and 12B have identical structures, interlocking mating parts, beams, channels and other features. Second bracket 12B may be mounted to and removed from second rail 10B in a fashion as described in this document in relation to fixture 12 and rail 10.

Figure 13:
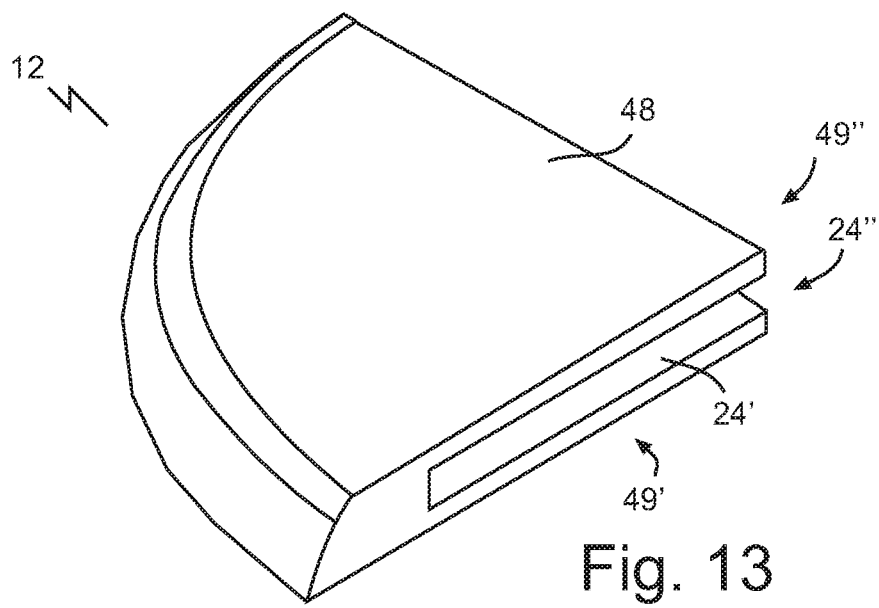
FIG. 13 is a perspective view of a corner shelf for mounting to the rail of FIG. 1.
Figures 14, 14A:
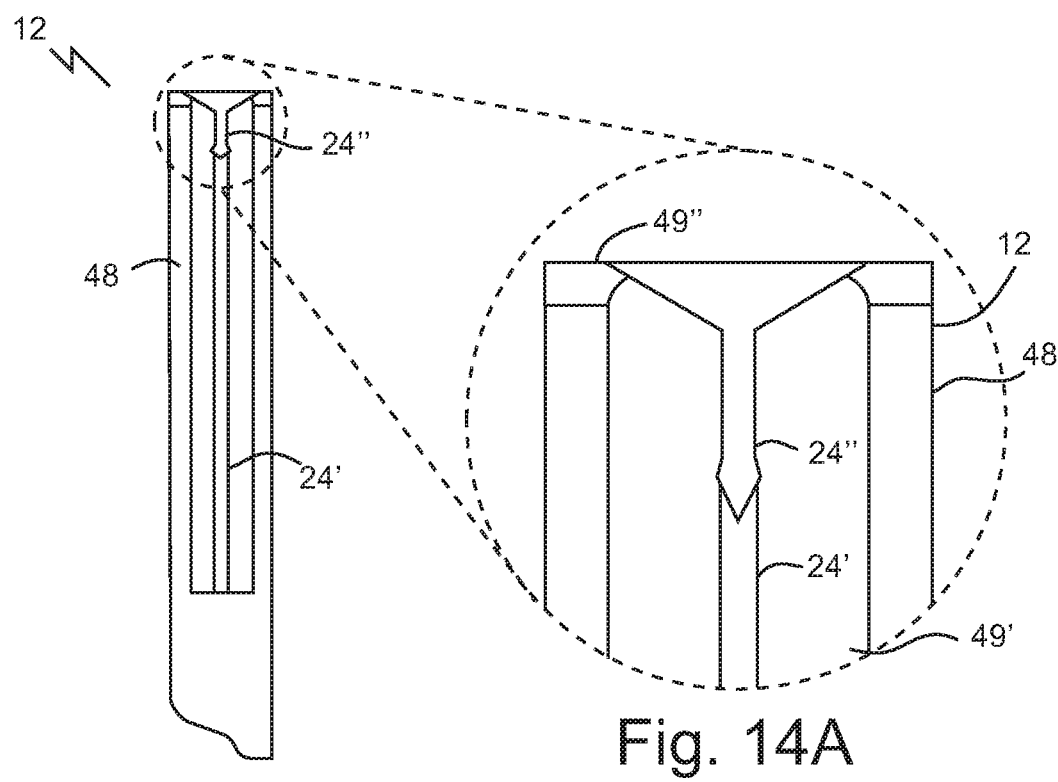
FIG. 14 is an end view of the shelf of FIG. 13.
FIG. 14A is an exploded view of the area delineated by dashed lines in FIG. 14.

Fixtures 12 other than the examples discussed above may be used to mount to the rail 10. Referring to FIGS. 11-14A, fixture 12 may form a shelf 48 capable of bearing weight. Referring to FIG. 11, in some cases, shelf 48 functions as a cup or toothbrush holder 50. Referring to FIGS. 13, 14, and 14A, fixture 12 may form a corner shelf 48, which may have a pair of adjacent edges 49' and 49" forming respective intersecting channels 24' and 24". Shelf 48 may be mounted to one or more respective rails 10, via interlocking mating parts on one or more of adjacent edges 49' and 49" and rail 10. As a corner shelf 48, each adjacent edge of the pair of edges 49' and 49" may face a substrate such as a wall.

Fixture 12 and rail 10 may be configured to fulfill a variety of purposes. Fixture 12 may be an elongate strip of material having an ornamental design. Rail 10 may have an elongate shape. Beam 22 and channel 24 may each have an elongate shape. Referring to FIGS. 1 and 2B, a series of lights such as LEDs (not shown) may be mounted to fixture 12 (FIG. 2B) for decorative lighting or to draw attention to display face 16C (FIG. 1) of panel 16. The rail and fixture may grip one another with sufficient friction to restrict or prevent relative sliding in a axial direction of one of the rail or fixture along the other.

Configurations of mating parts other than a single beam and channel may be used (not shown). Referring to FIG. 2B, for example, beam 22 and channel 24 may comprise a series or plurality of male parts or beam parts (not shown), for example decorative beam parts, and corresponding female parts or channel parts, for example parts having an inverse shape, relative to the male parts, or recess, respectively. The series or plurality of male parts or beam parts may be spaced along longitudinal axis 22A of beam 22 and the series or plurality of corresponding female parts or channel parts may be spaced along longitudinal axis 24A of channel 24. Beam 22 may be positioned on fixture 12, and channel 24 on rail 10. Other configurations may be used where the fixture 12 defines a male profile and the rail 10 defines a female profile.

Substrate 14 may take any of a variety of forms to fulfill a variety of purposes. Referring to FIG. 2B, substrate 14 may be a wall or other support surface, such as a counter top. The wall may have an upright, angled, curved or other configuration, including non-vertical configurations. The wall may extend from a floor to a ceiling. In some cases, the wall extends from a floor to a height below a ceiling. In some cases the panel or paneling retained between the brackets 12A and 12B extends from floor to ceiling or a substantial part of the height of same. Panel 16 may take any of a variety of forms to fulfill a variety of purposes. In some cases a part other than a panel may be retained between the brackets 12A and 12B, for example if a shelf or weight bearing support ledge is retained between brackets 12A and 12B. Panel 16 may have a non-planar configuration. The apparatuses disclosed here may be provided as a kit, for example comprising one or more of rail 10, fixture 12 and panel 16. In some cases the second bracket lacks a rail, for example if the bracket is directly secured to the substrate 14. The fixture and rail may be mounted at a suitable location on the substrate, for example adjacent a floor if the fixture is a baseboard, adjacent a roof if a crown moulding, and partway between floor and ceiling if the fixture is a shelf or panel retainer. Instead of open ended the channel 24 may have walls closing off the axial ends of the channel 24. Tapering in this document encompasses straight, curved, continuous, or discrete changes in shape along a length of material.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. An apparatus comprising:
   a substrate;
   a rail mounted to the substrate;
   a first bracket mounted to the rail;
   a second bracket mounted to the substrate and spaced to define a gap between the first bracket and the second bracket;
   a panel retained by the first bracket and the second bracket in a position within the gap and over the substrate;
   in which the first bracket is mounted to the rail via interlocking mating parts on the first bracket and the rail, with the interlocking mating parts reversibly interlocking via a snap fit that permits the first bracket and the rail to be separated after installation without damaging the rail;
   in which the first bracket and the second bracket are configured to prevent the panel from being removed from the gap in an outward direction away from the substrate without first separating one or both the first bracket and the second bracket from the rail and the substrate, respectively;
   in which the interlocking mating parts comprise a beam and a channel forming a male profile and a female profile, respectively, with the rail forming a base plate that has a substrate contacting side and an exterior side, and with the beam and the channel formed on an exterior side of the rail and a base side of the first bracket, respectively;
   in which the beam extends from the exterior side of the base plate between opposed lateral edges of the base plate, with a pair of bracket contacting shoulders, of the exterior side of the base plate, being located on either lateral side of the beam; and
   the pair of bracket contacting shoulders each defining a fastener positioning guide channel, which is spaced from the base side of the first bracket and whose longitudinal axis runs parallel to a longitudinal rail axis.

2. The apparatus of claim 1 in which respective longitudinal axes of the beam and the channel extend along the rail parallel to the longitudinal rail axis, with the male profile and the female profile being defined in cross-section perpendicular to the respective longitudinal axes.

3. The apparatus of claim 2 in which each of the male profile and the female profile extends with uniform shape at least part way along the respective longitudinal axes.

4. The apparatus of claim 1 in which:
   the beam extends from axial end to axial end of the rail; and
   the channel formed on the base side of the first bracket extends from axial end to axial end of the first bracket.

5. The apparatus of claim 1 in which:
   the beam is connected, or integrally formed, to the exterior side of the base plate to extend from the exterior side; and
   the pair of shoulders are each tapered with increasing distance from the substrate in a direction from an adjacent respective outside lateral edge of the base plate to the beam, with the fastener positioning guide channel located intermediate between the respective outside lateral edge and the beam.

6. The apparatus of claim 1 in which:
the male profile of the beam is formed by a stem with a lateral projection, with the female profile having a lateral slot shaped to receive the lateral projection; and
the male profile has a pair of opposed lateral projections on either side of the stem, and the stem forms a base and a tip, with the tip and pair of opposed lateral projections being formed by respective apexes of a rhombus defined in cross section perpendicular to a longitudinal rail axis.

7. The apparatus of claim 1 in which:
the male profile of the beam is formed by a stem with a lateral projection, with the female profile having a lateral slot shaped to receive the lateral projection; and
the stem forms a base and a tip, with the tip and lateral projection being formed with the shape of a rectangle defined in cross section perpendicular to a longitudinal rail axis.

8. The apparatus of claim 1 further comprising a second rail mounted to the substrate, in which the second bracket is mounted to the second rail via second interlocking mating parts on the second bracket and the second rail, and in which:
the second interlocking mating parts comprise a second beam and a second channel that form a second male profile and a second female profile, respectively; and
respective longitudinal axes of the second beam and the second channel extend in respective axial directions along the second rail, with the second male profile and the second female profile being defined in cross-section perpendicular to the respective longitudinal axes.

9. The apparatus of claim 1 in which:
respective lateral shoulders of the first bracket and the second bracket engage opposed sides of a peripheral edge of the panel; and
each respective lateral shoulder is tapered with increasing distance from a plane, defined perpendicular to the substrate along a respective longitudinal axis of the respective first bracket or second bracket, when moving away from the substrate.

10. The apparatus of claim 1 in which the first bracket forms a decorative moulding that covers and hides the rail from view.

11. The apparatus of claim 1 in which the substrate is a wall and the panel is a decorative tile.

12. The apparatus of claim 11 in which the panel forms part of a kitchen or bathroom backsplash.

13. The apparatus of claim 1 in which:
respective lateral shoulders of the first bracket and the second bracket engage opposed sides of a peripheral edge of the pane; and
the respective lateral shoulders are sufficiently rigid to contact the panel to prevent the panel from being removed from the gap in an outward direction away from the substrate without first separating one or both the first bracket and the second bracket from the rail and the substrate, respectively.

14. The apparatus of claim 1 in which each fastener positioning guide channel is positioned with an external surface parallel to the substrate.

15. The apparatus of claim 1 in which plural fasteners are passed through the fastener positioning guide channels out of contact with the base side of the first bracket.

16. An apparatus comprising:
a wall forming part of a building;
a rail with a wall contacting base side, an exterior side, and a beam formed on the exterior side of the rail, with the wall contacting base side mounted to the wall;
a fixture with a base side, an exterior side, and a channel formed on the base side;
in which the channel, which is formed on the base side, forms a female profile that is reversibly interlocking, without the application of adhesives and fasteners between the fixture and the rail, via a snap fit to a male profile formed by the beam to reversibly mount the fixture on the rail and permit the fixture and the rail to be separated after installation without damaging the rail, with respective longitudinal axes of the beam and the channel extending in respective axial directions along the rail;
in which the beam extends from the exterior side of the rail between opposed lateral edges of the rail, with a pair of fixture contacting shoulders, of the exterior side of the rail, located on either lateral side of the beam; and
the pair of fixture contacting shoulders each defining a fastener positioning guide channel, which is spaced from the base side of the fixture and whose longitudinal axis runs parallel to a longitudinal rail axis.

17. The apparatus of claim 16 in which each fastener positioning guide channel is positioned with an external surface parallel to the wall.

18. The apparatus of claim 16 in which:
the beam extends from axial end to axial end of the rail; and
the channel formed on the base side of the fixture extends from axial end to axial end of the fixture.

19. The apparatus of claim 16 in which plural fasteners are passed through the fastener positioning guide channels out of contact with the base side of the fixture.

* * * * *